United States Patent
Platt Brown et al.

[11] Patent Number: 6,076,863
[45] Date of Patent: Jun. 20, 2000

[54] COUPLING ASSEMBLY FOR MULTI-DUCT CONDUITS

[75] Inventors: George Henry Platt Brown, Galashiels; Bernard Gajos, Roxburghshire, both of United Kingdom

[73] Assignee: Mainetti Technology Limited, Roxburghshire, United Kingdom

[21] Appl. No.: 09/043,705

[22] PCT Filed: Sep. 12, 1996

[86] PCT No.: PCT/GB96/02272

§ 371 Date: Mar. 25, 1998

§ 102(e) Date: Mar. 25, 1998

[87] PCT Pub. No.: WO97/12169

PCT Pub. Date: Apr. 3, 1997

[30] Foreign Application Priority Data

Sep. 26, 1995 [GB] United Kingdom .................... 9519599

[51] Int. Cl.[7] .................................................. F16L 39/00
[52] U.S. Cl. ................................ 285/124.1; 285/124.3
[58] Field of Search ............................ 285/124.1, 124.2, 285/124.3, 124.4, 124.5, FOR 113, FOR 120

[56] References Cited

U.S. PATENT DOCUMENTS

| Re. 34,332 | 8/1993 | Adams et al. | 285/124.1 |
|---|---|---|---|
| Re. 34,978 | 6/1995 | Adams et al. | 285/124.1 |
| 3,340,932 | 9/1967 | Bloudoff | 285/124.1 |
| 3,822,903 | 7/1974 | McNeely et al. | 285/124.1 |
| 4,834,825 | 5/1989 | Adams et al. | 285/124.1 |
| 4,865,354 | 9/1989 | Allen | 285/18 |
| 5,078,432 | 1/1992 | Seiter . | |
| 5,236,227 | 8/1993 | Adams et al. | 285/27 |
| 5,238,328 | 8/1993 | Adams et al. | 405/154 |
| 5,372,388 | 12/1994 | Gargiulo | 285/24 |

FOREIGN PATENT DOCUMENTS

| 0203672 | of 0000 | European Pat. Off. . |
| 2068490 | 8/1981 | United Kingdom . |

*Primary Examiner*—Eric K Nicholson
*Attorney, Agent, or Firm*—Bliss McGlynn, P.C.

[57] ABSTRACT

A coupling assembly (1) for connecting first and second multi-duct conduits in aligned end to end relationship is disclosed. The assembly (1) includes a pair of end caps (4), each of which has apertures for receiving a respective duct of one of the first and second conduits, and a mounting portion arranged adjacent each aperture. A plurality of open ended tubular members (2), each of which has an internal bore for receiving a duct of the first and second conduits, are arranged parallel to each other between the end caps (4). The end caps (4) are mounted via the mounting portions to the end of the tubular members (2) such that the apertures of the end caps (4) are aligned with respective bores of the tubular members.

24 Claims, 6 Drawing Sheets

COUPLING ASSEMBLY FOR MULTI-DUCT CONDUITS

The present invention relates to a coupling assembly for multi-duct conduits in which a plurality of tubular ducts are disposed within a tubular outer body of each conduit. Such a coupling assembly is particularly, although not exclusively, suitable for underground use, for example in cable television networks or telecommunication networks.

A known coupling assembly is disclosed in U.S. Pat. No. 4,834,825, and serves to connect in aligned end to end relationship a pair of bores, each of which accommodates four inner conduits, so that the inner conduits of each bore are aligned to provide four continuous channels to accommodate transmission lines therein. The coupling assembly comprises a moulded coupler body member having four bores therethrough, each of the bores having internal dimensions corresponding to the outer dimensions of the conduits to be received, the body member also having a plurality of pins moulded thereon to enable an end cap having apertures corresponding to the bores therethrough to be mounted to each end of the body member so that a sealing gasket is held between each end cap and the body member.

This known coupling assembly suffers from the drawback that the moulded main body member requires very complicated mouldings, involving substantial differences in thickness in the various sections or parts of the moulding. Also, the pins which hold the end caps in place are moulded onto the main body portion, which is the heaviest part of the assembly. To minimise costs, the main body portion should be moulded from a relatively inexpensive material, but which would generally have a lower tensile strength than is desirable in situations in which the assembly is subjected to high air pressure in use, for example for the purpose of cable blowing.

Embodiments of the present invention seek to overcome the above disadvantages of the prior art.

According to an aspect of the present invention, there is provided a coupling assembly for connecting first and second multi-duct conduits in aligned end to end relationship, the assembly comprising first and second end caps, each said end cap having a plurality of apertures therethrough for receiving a respective duct of one of said first and second conduits, and a respective mounting portion arranged adjacent each said aperture; and a plurality of open-ended tubular members, each said tubular member having an internal bore for receiving a duct of said first and second conduits in respective ends thereof, wherein when the assembly is in use, said tubular members are arranged substantially parallel to each other between said first and second end caps, and said end caps are mounted via said mounting portions to the ends of the tubular members such that the apertures of the first and second end caps are aligned with respective bores of the tubular members.

By constructing the coupling assembly from a plurality of tubular members mounted between two end caps, the constituent parts of the assembly can be moulded more simply than in the case of the prior art. This provides the advantage of enabling the mould costs to be reduced and better control of tolerances in manufacture to be achieved. The use of a plurality of separate tubular members also enables the assembly to be easily adapted to connect conduits carrying different numbers of ducts, thus making the assembly more versatile than the known assemblies.

Preferably, each said mounting portion comprises one or more resilient clips for resiliently engaging an end portion of a respective tubular member to prevent axial separation of the end cap and tubular member.

The provision of resilient means on the end caps, as opposed to the tubular members provides the advantage that the end caps, which involve the use of less material than the tubular members, can be moulded from an engineering polymer with very high tensile strength but at relatively low cost.

The assembly may be adapted to permit limited axial relative movement between the mounting portions and the corresponding tubular members when mounted thereto.

This provides the advantage of enabling variation in the dimensions of the component parts caused by manufacturing tolerances or temperature variations to be accommodated.

In a preferred embodiment, each said resilient clip engages the corresponding tubular member internally thereof.

This provides the advantage of enabling the clips to be held in engagement with the internal surface of the tubular members by insertion of the ducts of the conduits into the tubular members, so that disengagement of the clips from the tubular members is prevented when the ducts are in place.

Each said tubular member may comprise a recess on the external surface thereof for engagement with spacer means for arranging the tubular members substantially parallel to each other.

The provision of one or more recesses for engagement by spacer means facilitates assembly.

Preferably, each said tubular member comprises abutment means arranged in the bore thereof for abutment against respective ducts of said first and second conduits.

The provision of abutment means assists in locating the ducts of the conduits at the correct position in respective tubular members.

The assembly preferably further comprises at least one spacer element for arranging the tubular members substantially parallel to each other.

The or each spacer element may comprise a plurality of resilient projections arranged circumferentially thereof and defining respective recesses therebetween for resiliently receiving respective tubular members.

The assembly may further comprise sealing means for sealing between said tubular members and respective ducts therein.

The provision of sealing means enables a substantially air tight seal between the tubular members and respective ducts to be achieved, which in turn enables the cable system in use to be pressurised by means of compressed air for cable blowing, or placement of a rope for pulling a cable along a duct.

The sealing means may comprise a plurality of O-ring seals, or a gasket having a plurality of apertures therein for alignment with the apertures of a corresponding end cap.

The apertures of the end caps are preferably widened at the ends thereof remote from the respective mounting portions.

This widening of the apertures facilitates location of the ducts of the conduits in the apertures.

According to another aspect of the present invention, there is provided a coupling body for connecting first and second multi-duct conduits in aligned end to end relationship, wherein the coupling body is constructed from an assembly as defined above.

The assembly may comprise 3, 4 or 7 tubular members.

Preferred embodiments of the invention will now be described, by way of example only, and not in any limitative sense, with reference to the accompanying drawings, in which.

Figure 1:
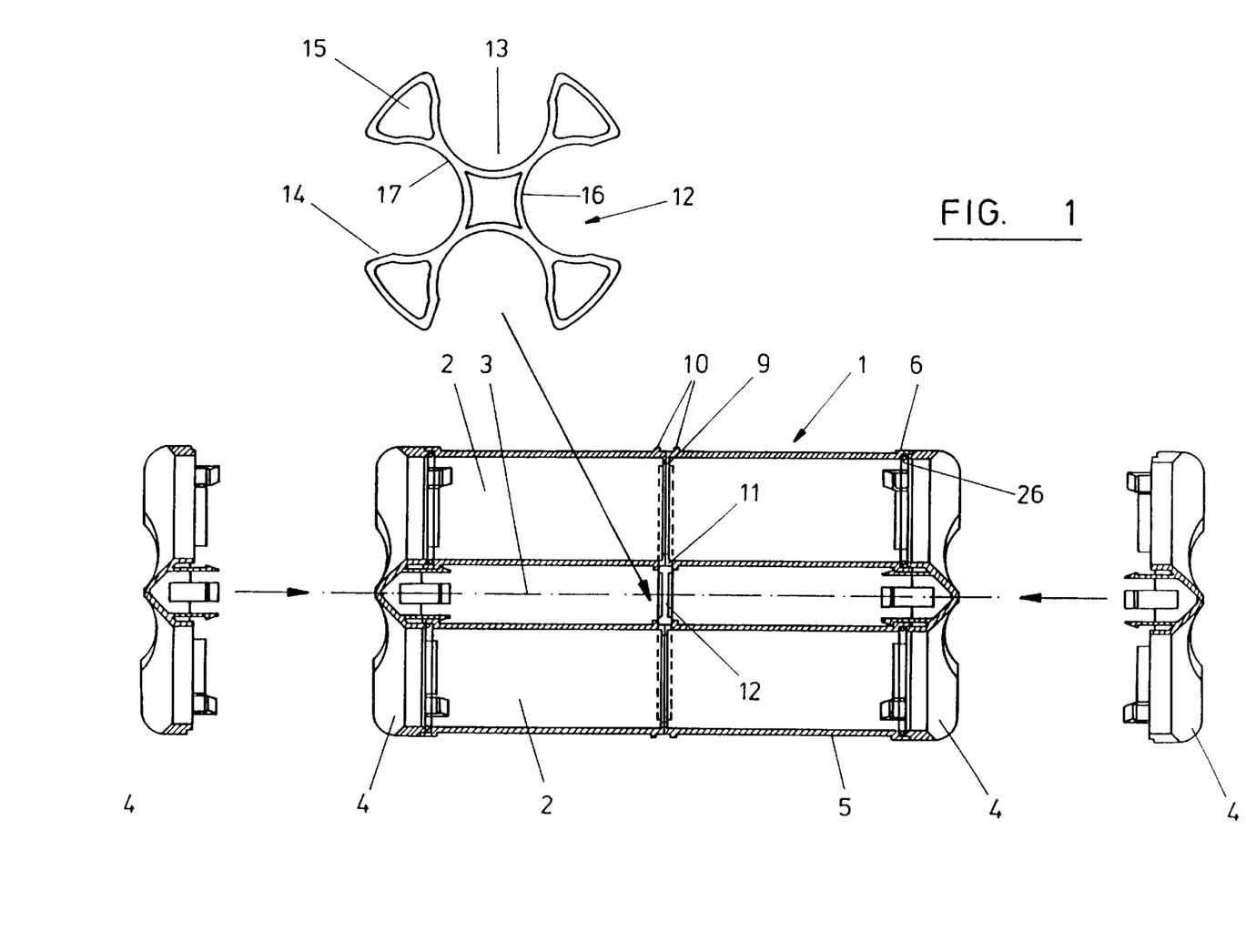
FIG. 1 is an exploded view of a coupling assembly of a first embodiment of the present invention.

Referring to FIG. 1, a coupling assembly 1 of a first embodiment of the invention comprises four open-ended, generally cylindrical tubular members 2 formed by moulding suitable plastics material. The members 2 are arranged symmetrically with respect to each other circumferentially around a central axis 3 of the assembly 1 and a pair of end caps 4 are resiliently clipped in place on the ends of the tubular members 2.

Figure 5:
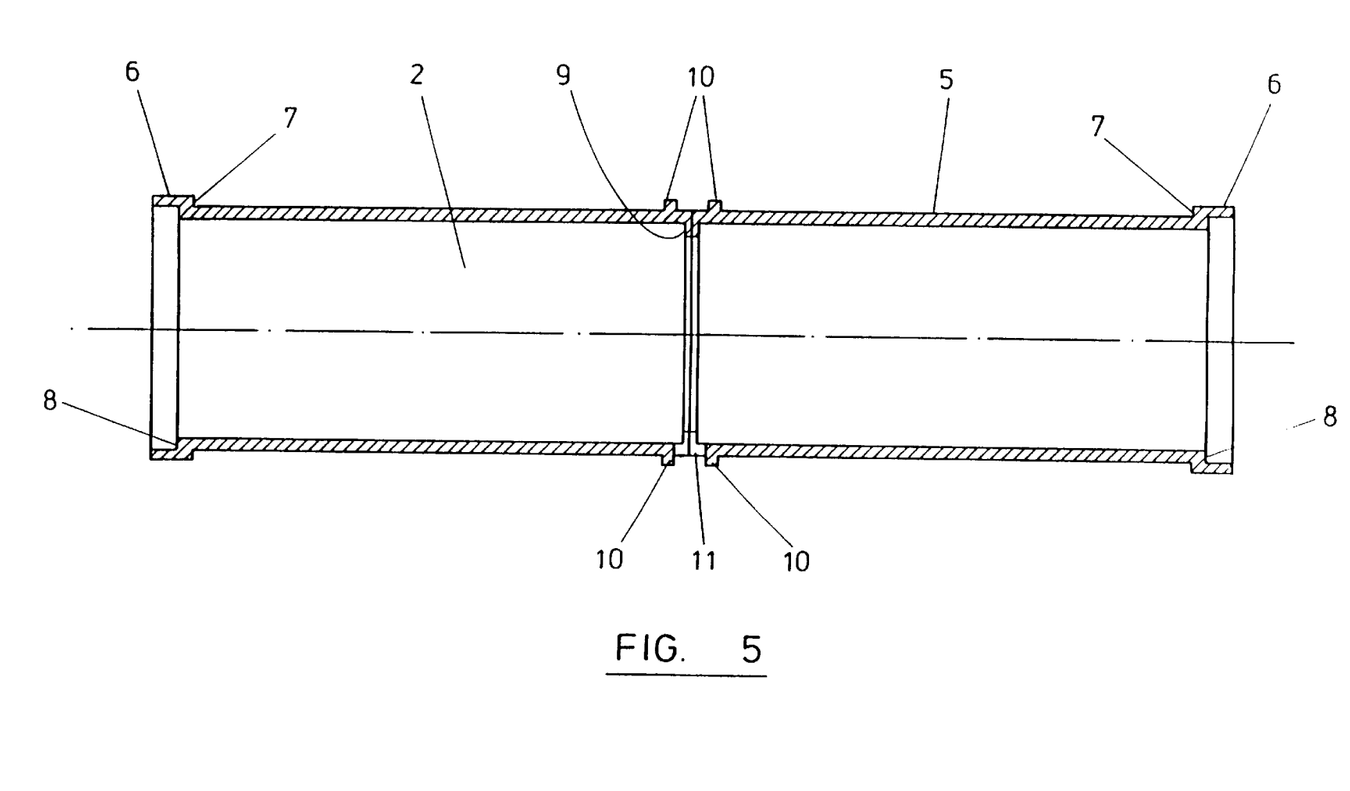
FIG. 5 is a cross-sectional view of a tubular member of the coupling assembly of FIG. 1.

Each of the tubular members 2 comprises an elongate cylindrical body portion 5 having a widened rim 6 at each of its ends, such that the widened rims 6 define external radial surfaces 7 and internal radial surfaces 8, the function of which will be described below and is shown in greater detail in FIG. 5. Each of the tubular members 2 also has an internal projection 9 at the central part thereof, and a pair of spaced apart external projections 10 on the external surface of the body portion 5 on both sides of the internal projection 9. A recess 11 is also provided on the body portion 5 opposite to the internal projection 9 and between external projections 10.

Figure 3A:
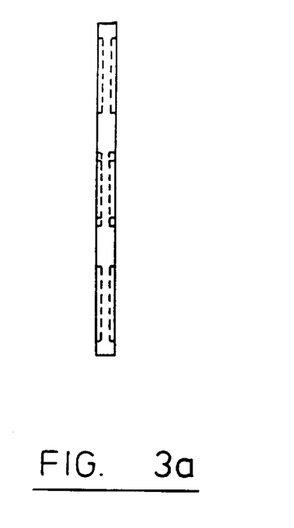
FIGS. 3a and 3b are respective cross-sectional side and end views of a spacer element of the coupling assembly of FIG. 1.
Figure 3B:
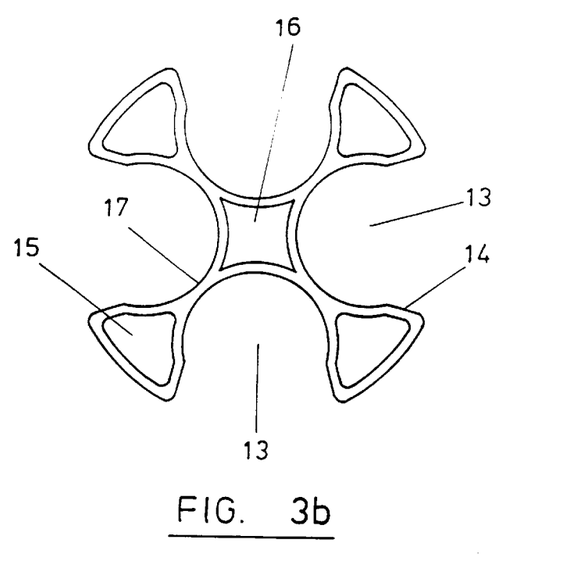

The tubular members 2 are positioned symmetrically about axis 3 by means of a resilient spacer element 12 as shown in greater detail in FIGS. 3a and 3b. The spacer element 12 is a generally cross-shaped member of moulded plastics material defining four generally semi-circular recesses 13 for resiliently receiving respective tubular members 2. Each of the recesses 13, has an internal diameter corresponding to the external diameter of the body portions 5 of the body portions 5 of the tubular members 2, and has a widened circumferential region 14 to facilitate location of a tubular member 2 in the recess 13. The recesses 13 are separated from each other by spacer regions 15, each of which is joined to a central portion 16 of the spacer element by means of a resilient neck 17, so that the spacer region 15 can be displaced slightly from the central region 16 during location of a tubular member 2 in a recess 13. The dimensions of the spacer element 12 are such that it can be received in recess 11 of each of the tubular members 2 located in respective recesses 13.

Figure 2:
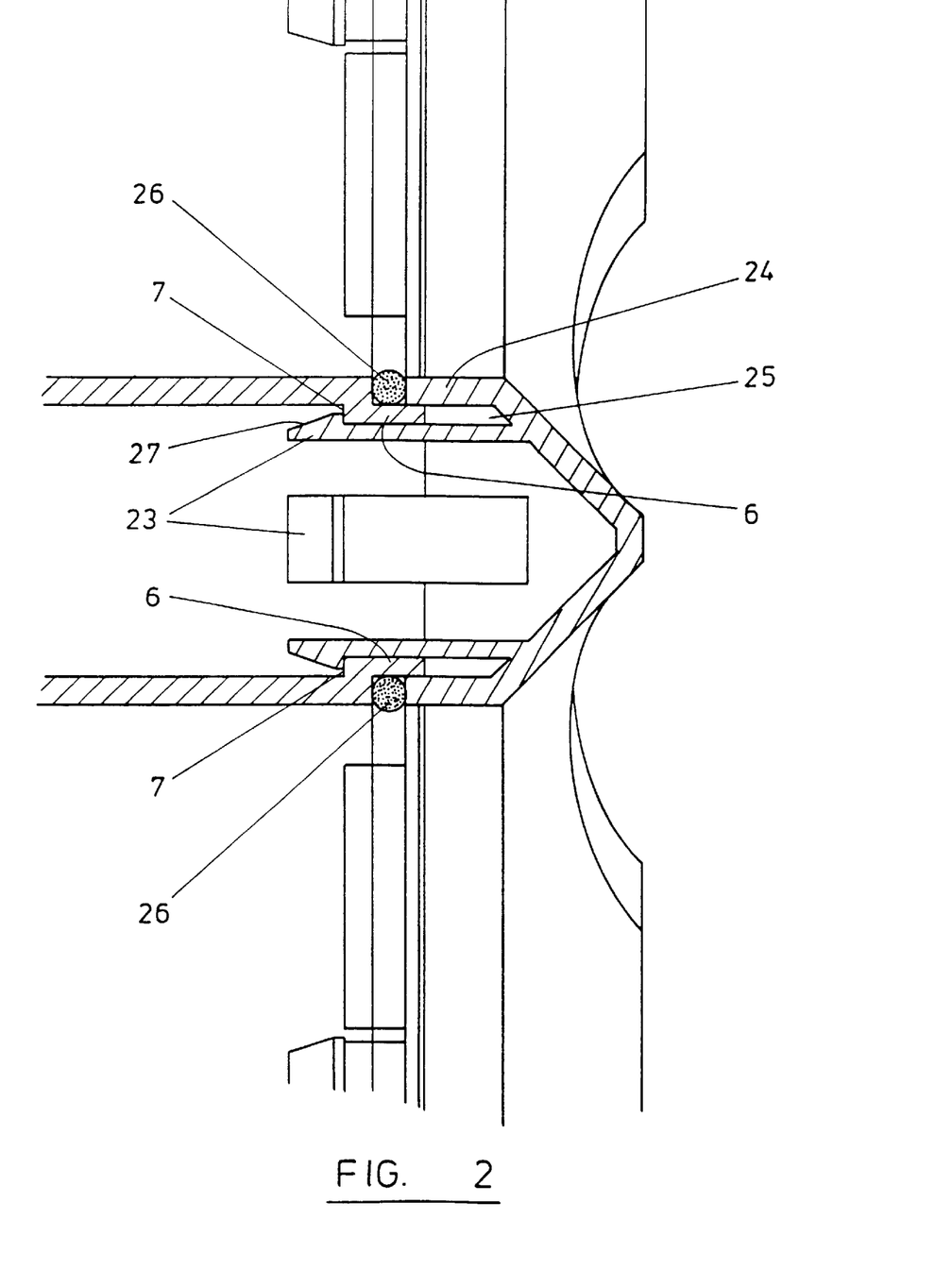
FIG. 2 is a detailed view of a portion of the coupling assembly of FIG. 1.
Figure 4A:
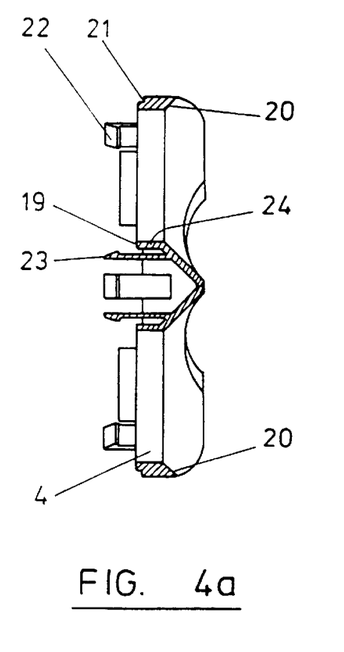
FIGS. 4a and 4b are respective side and end views of an end cap of the coupling assembly of FIG. 1.
Figure 4B:
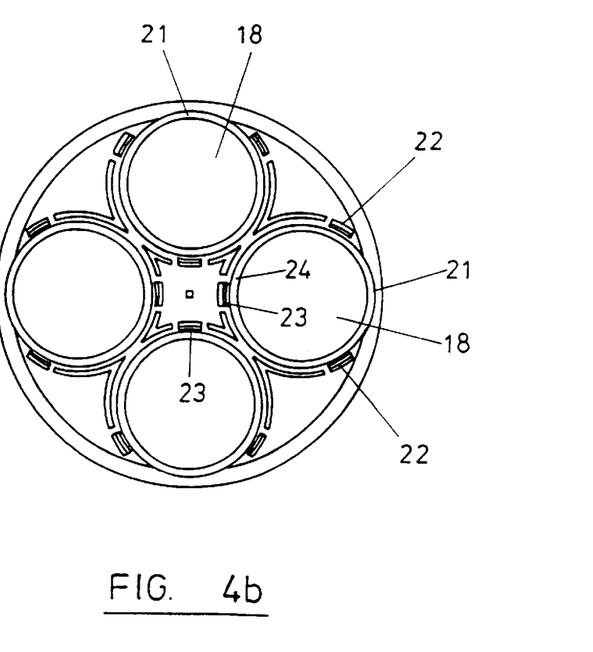

As shown in greater detail in FIGS. 4a and 4b, each of the end caps 4 has four apertures 18 therethrough, each of the apertures 18 having a diameter at an inner side 19 thereof corresponding to the internal diameter of the tubular members 2, as can be seen in detail in FIG. 2. The apertures 18 are widened at outer side 20 of the end cap 4 to facilitate insertion of ducts (not shown) of conduits through the apertures 18 and thus into the internal bores of tubular members 2.

The inner side 19 of each of the end caps 4 is provided with four stepped portions 21 at the periphery thereof for engagement with widened rims 6 of the corresponding tubular members 2, and two resilient clips 22 protrude axially from the periphery of each aperture 18 in the outer peripheral region of end caps 4. Four resilient inner clips 23 are arranged parallel to clips 22 such that each aperture 18 has a clip 23 and two clips 22 arranged symmetrically about the axis of each aperture 18. The clips 23 are arranged at the central portion of the end caps 4, and are spaced from respective walls 24 of each aperture 18 to define a recess 25 therebetween which is sufficiently large to accommodate the walls 6f widened rim 6 of a tubular member 2 therein, as shown in greater detail in FIG. 2. The length of recess 25 is sufficient to accommodate variations in the axial dimensions of rim 6 and O-ring seals 26 which are arranged in the internal periphery of each widened rim 6 and abut against inner redial surface 8. Each of the 0ring seals 26 has an internal diameter slightly less than that of the tubes 3, so that each seal 26 projects slightly into the internal bore of tubular member 2. This ensures sealing action between the tubular member 2 and a corresponding duct (not shown) of a conduit when the duct is inserted into the tubular member 2.

As an alternative to the provision of a plurality of O-ring seals 26, a single flexible gasket member may be provided between each end cap 4 and the tubular members 2, as will be appreciated by persons skilled in the art.

To assemble a coupling body from the coupling assembly 1 shown in FIGS. 1 to 5 the tubular members 2 are arranged generally parallel to each other, and are accommodated in respective recesses 13 of the spacer member 12 such that the periphery of each recess 13 is received in recess 11 of the corresponding tubular member. The O-ring seals 26 are then received in the internal periphery of widened rims 6, and the end caps 4 are mounted to the ends of the tubular members 2 such that apertures 18 are aligned with the bores of the corresponding tubular members 2. As each end cap 4 is pushed into engagement with the ends of the tubular members 2, stepped portions 21 and walls 24 hold the O-ring seals 26 in place such that the seals 26 protrude slightly into the internal bores of the tubular members 2. At the same time, resilient members 23 are caused to bend outwards relative to the corresponding tubular member 2 as a result of widened rim 6 sliding over guide surface 27, until the resilient clips 23 snap into engagement behind external radial surface 7 of the tubular member to prevent axial separation of the tubular members 2 and end cap 4, as shown in FIG. 2.

Figure 6:
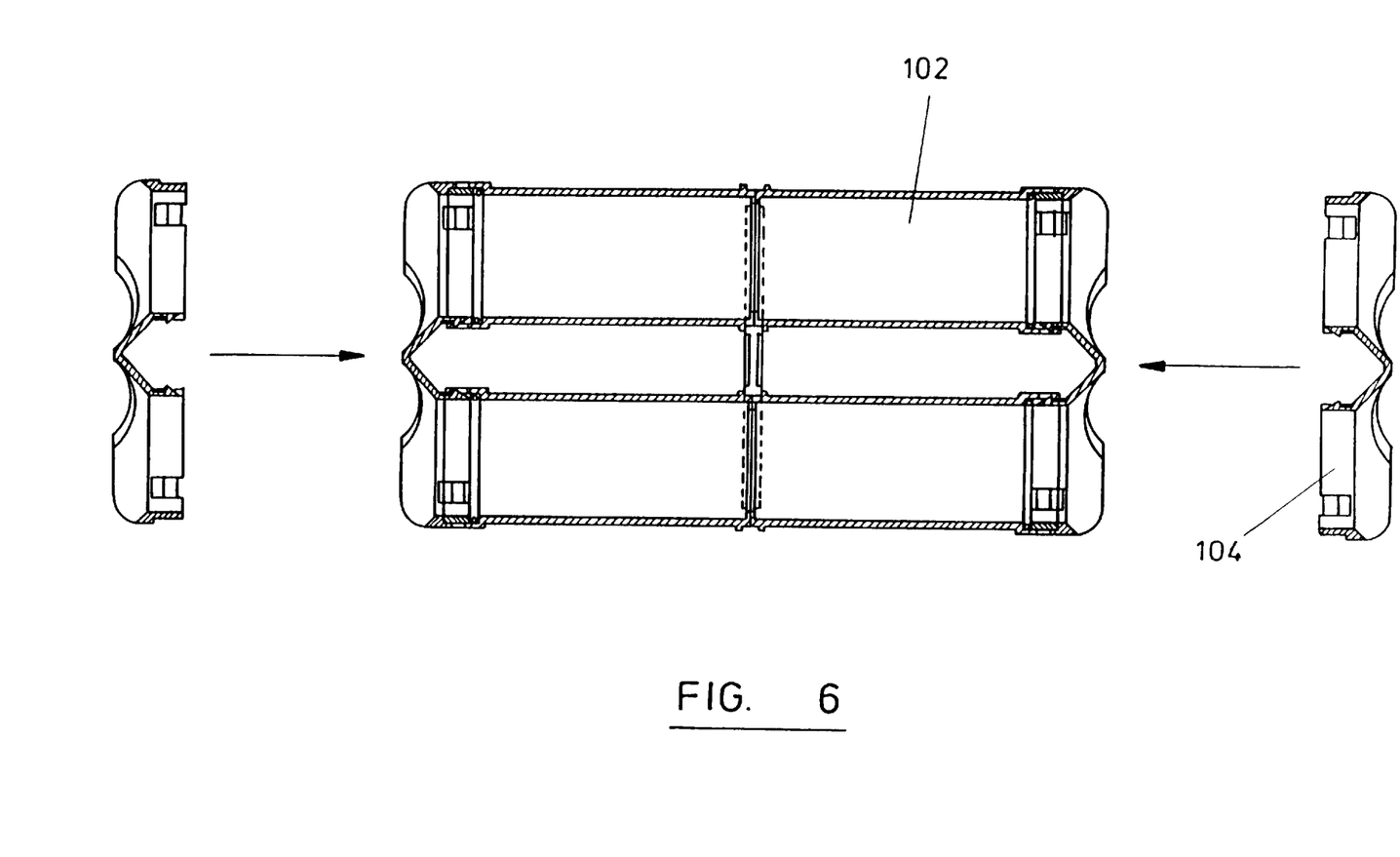
FIG. 6 is an exploded view, corresponding to FIG. 1, of a coupling assembly of a second embodiment of the present invention.
Figure 7:
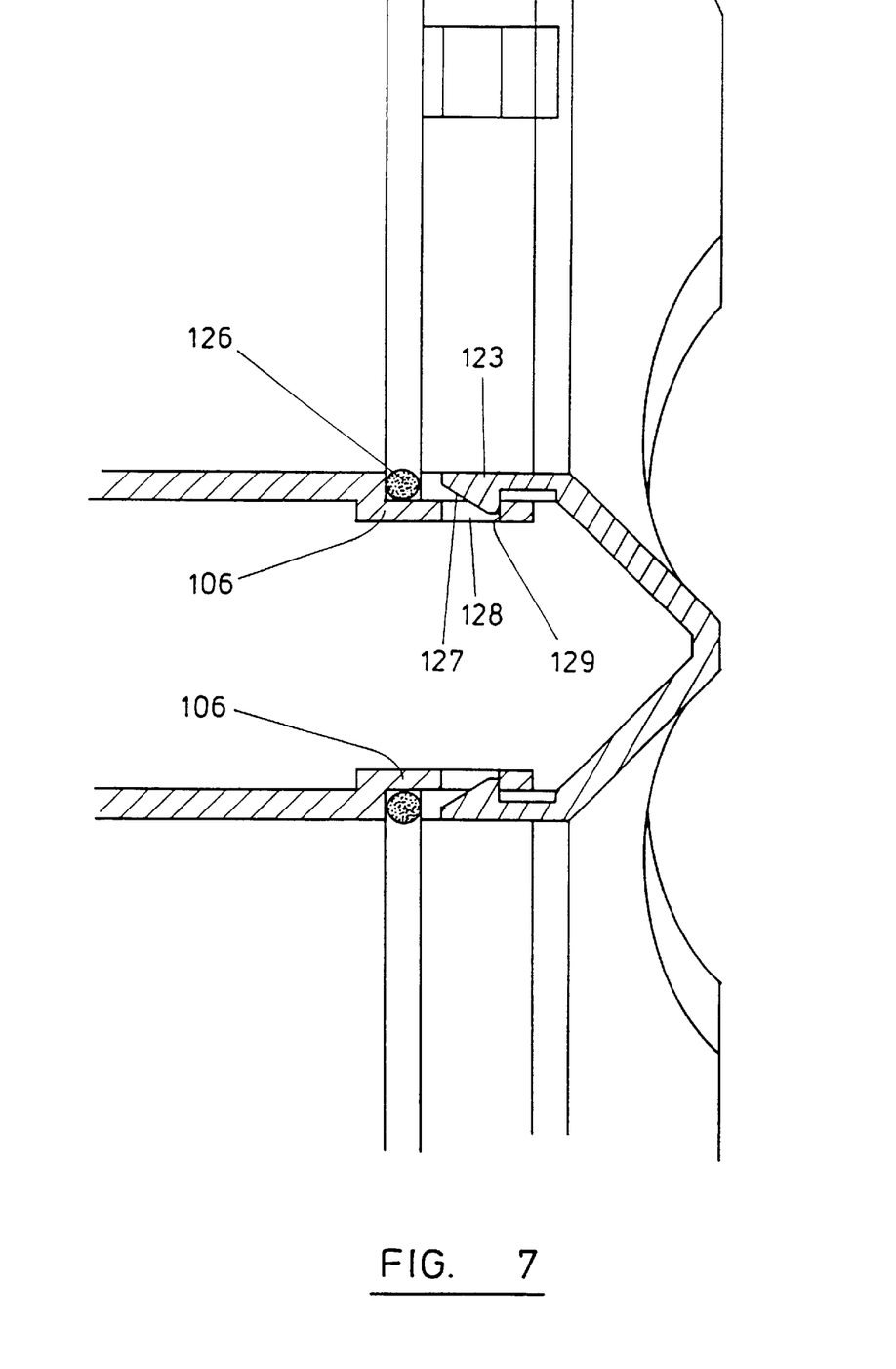
FIG. 7 is a detailed view, corresponding to FIG. 2, of a portion of the coupling assembly of FIG. 6.

FIG. 6 shows a second embodiment of the invention in which components corresponding to those shown in FIGS. 1 to 5 have like reference numerals but increased by 100. As can be seen in greater detail in FIG. 7, widened rim 106 of each tubular member 102 extends further axially than the rim 6 shown in FIG. 2, and is provided with apertures or recesses 128 having abutment surfaces 129 at the axial outer end thereof. Inner resilient clips 123 have guide surfaces 127 adapted to engage the inner edge of widened rim 106 so that the resilient clips 123 are deflected inwardly relative to the tubular member 102 as the widened rim 106 slides over the guide surface 127. Accordingly when end caps 104 are placed on the ends of tubular members 102, widened rim 106 causes resilient clips 123 to be deflected inwardly until they can spring back into engagement with recesses 128 such that abutment of the resilient clips 123 with the corresponding abutment surfaces 129 of recesses 128 prevents axial separation of the end caps 104 and tubular members 102. Because resilient clips 123 engage the tubular members 102 inwardly thereof, they are subsequently held in place by ducts (not shown) inserted into the tubular members 2.

In use of the assemblies described with reference to FIGS. 1 to 7, the four ducts (not shown) of a first conduit are aligned with the apertures 18 and insertion of the ducts into the apertures 18 is facilitated by the widened portions of the apertures at the outer side 20 of the end cap 4. The ducts are then pushed along the inner bores of the tubular members 2 or 102 until the end wall of each duct comes into abutment with the corresponding internal projection 9. The protrusion of sealing members 26 or 126 into the internal bore of the tubular members 2 or 102 ensures sealing action between the ducts and the corresponding tubular members 2 or 102 into which they are received.

At the same time, an outer member (not shown) of the conduit accommodating the ducts passes over the external surface of the assembly 1 until it comes into engagement with one of the external projections 10 to secure the external member thereto. A seal (not shown) between the outer members of the conduits and/or the tubular members 2 or 102 prevents ingress of moisture or dirt into the assembly 1. By a similar process, the ducts of a second conduit are received in the opposite ends of the tubular members 2 or 102 so that pairs of ducts received in each tubular member 2 or 102 are aligned in end to end relationship.

It will be appreciated by persons skilled in the art that the above embodiments have been described by way of example only, and not in any limitative sense, and that various modifications and alterations are possible without departure from the scope of the invention as defined by the appended claims.

What is claimed is:

1. A coupling assembly for connecting first and second multi-duct conduits in aligned end to end relationship, the assembly comprising.

first and second end caps, each of said end cap having a plurality of apertures therethrough for receiving a respective duct of one of said first and second conduits, and a respective mounting portion arranged adjacent each said aperture; and a plurality of separate open-ended tubular members, each said tubular member having an internal bore for receiving a duct of said first and second conduits in respective ends thereof, wherein the assembly is in use, said tubular members are arranged substantially parallel to each other between said first and second end caps, and said end caps are mounted via said mounting portions to the ends of the tubular members such that the apertures of the first and second end caps are aligned with respective bores of the tubular members.

2. An assembly according to claim 1, wherein each said mounting portion comprises one or more resilient clips for resiliently engaging an end portion of a respective tubular member to prevent axial separation of the end cap and tubular member.

3. An assembly according to claim 2, wherein the assembly is adapted to permit limited axial relative movement between the mounting portions and the corresponding tubular members when mounted thereto.

4. An assembly according to claim 2, wherein each said resilient clip engages the corresponding tubular member internally thereof.

5. An assembly according to claim 4, wherein each said tubular member comprises a recess on the external surface thereof for engagement with spacer means for arranging the tubular members substantially parallel to each other.

6. A coupling assembly for connecting first and second multi-duct conduits in aligned end to end relationship, the assembly comprising:

first and second end caps, each of said end cap having a plurality of apertures therethrough for receiving a respective duct of one of said first and second conduits, and a respective mounting portion arranged adjacent each said aperture; and a plurality of open-ended tubular members, each said tubular member having an internal bore for receiving a duct of said first and second conduits in respective ends thereof, wherein the assembly is in use, said tubular members are arranged substantially parallel to each other between said first and second end caps, and said end caps are mounted via said mounting portions to the ends of the tubular members such that the apertures of the first and second end caps are aligned with respective bores of the tubular members, wherein each said tubular member comprises abutment means arranged in the bore thereof for abutment against respective ducts of said first and second conduits.

7. A coupling assembly for connecting first and second multi-duct conduits in aligned end to end relationship, the assembly comprising:

first and second end caps, each of said end cap having a plurality of apertures therethrough for receiving a respective duct of one of said first and second conduits, and a respective mounting portion arranged adjacent each said aperture;

a plurality of open-ended tubular members, each said tubular member having an internal bore for receiving a duct of said first and second conduits in respective ends thereof, wherein the assembly is in use, said tubular members are arranged substantially parallel to each other between said first and second end caps, and said end caps are mounted via said mounting portions to the ends of the tubular members such that the apertures of the first and second end caps are aligned with respective bores of the tubular members; and at least one spacer element for arranging the tubular members substantially parallel to each other.

8. An assembly according to claim 7, wherein the or each spacer element comprises a plurality of resilient projections arranged circumferentially thereof and defining respective recesses therebetween for resiliently receiving respective tubular members.

9. A coupling assembly for connecting first and second multi-duct conduits in aligned end to end relationship, the assembly comprising:

first and second end caps, each of said end cap having a plurality of apertures therethrough for receiving a respective duct of one of said first and second conduits, and a respective mounting portion arranged adjacent each said aperture;

a plurality of open-ended tubular members, each said tubular member having an internal bore for receiving a duct of said first and second conduits in respective ends thereof, wherein the assembly is in use, said tubular members are arranged substantially parallel to each other between said first and second end caps, and said end caps are mounted via said mounting portions to the ends of the tubular members such that the apertures of the first and second end caps are aligned with respective bores of the tubular members; and sealing means for sealing between said tubular members and respective ducts inserted therein.

10. An assembly according to claim 9, wherein the sealing means is arranged in use between the tubular members and the end caps.

11. An assembly according to claim 10, wherein the sealing means comprises a plurality of O-ring seals, or a gasket having a plurality of apertures therein for alignment with the apertures of a corresponding end cap.

12. A coupling assembly for connecting first and second multi-duct conduits in aligned end to end relationship, the assembly comprising:

first and second end caps, each of said end cap having a plurality of apertures therethrough for receiving a respective duct of one of said first and second conduits, and a respective mounting portion arranged adjacent each said aperture; and a plurality of open-ended tubular members, each said tubular member having an internal bore for receiving a duct of said first and second conduits in respective ends thereof, wherein the assembly is in use, said tubular members are arranged substantially parallel to each other between said first and second end caps, and said end caps are mounted via said mounting portions to the ends of the tubular members such that the apertures of the first and second end caps are aligned with respective bores of the tubular members, wherein the apertures of the end caps are widened at the ends thereof remote from the respective mounting portions.

13. A coupling body for connecting first and second multi-duct conduits in aligned end-to-end relationship, wherein the coupling body is constructed from as assembly comprising:

a plurality of separate open-ended tubular members, each of said tubular members having an internal bore for receiving a duct of said first and second conduits in respective ends thereof; and first and second end caps, each said end cap having a plurality of apertures therethrough for receiving a respective duct of one of said first and second conduits, and a respective mounting portion arranged adjacent each said aperture for mounting the end cap to the tubular members, wherein when the tubular members in use are arranged substantially parallel to each other between said end caps with each aperture of said end cap aligned with a bore of said tubular member.

14. A coupling body for connecting first and second multi-duct conduits in aligned end to end relationship, wherein the coupling body is constructed from an assembly according to any one of the preceding claims.

15. An assembly according to claim 3, wherein each said resilient clip engages the corresponding tubular member internally thereof.

16. An assembly according to claim 1, wherein each said tubular member comprises a recess on the external surface thereof for engagement with spacer means for arranging the tubular members substantially parallel to each other.

17. An assembly according to claim 1, wherein each said tubular member comprises abutment means arranged in the bore thereof for abutment against respective ducts of said first and second conduits.

18. An assembly according to claim 1, further comprising at least one spacer element for arranging the tubular members substantially parallel to each other.

19. An assembly according to claim 1, further comprising sealing means for sealing between said tubular members and respective ducts inserted therein.

20. An assembly according to claim 1, wherein the apertures of the end caps are widened at the ends thereof remote from the respective mounting portions.

21. A coupling assembly for connecting first and second multi-duct conduits in aligned end to end relationship comprising:

first and second end caps, each of said first and second end caps having a plurality of apertures therethrough for receiving a respective duct of one of the first and second conduits and a respective mounting portion arranged adjacent each of said apertures;

a plurality of open-ended tubular members, each of said tubular members having an internal bore for receiving a duct of the first and second conduits in respective ends thereof;

wherein when said assembly is in use, said tubular members are arranged substantially parallel to each other between said first and second end caps and said first and second end caps are mounted via said mounting portions to the ends of said tubular members such that said apertures of said first and second end caps are aligned with respective bores of said tubular members; and wherein each of said mounting portions comprises one or more resilient clips for resiliently engaging an end portion of a respective one of said tubular members to prevent axial separation between said end cap and said tubular member.

22. A coupling assembly for connecting first and second multi-duct conduits in aligned end to end relationship comprising:

first and second end caps, each of said first and second end caps having a plurality of apertures therethrough for receiving a respective duct of one of the first and second conduits and a respective mounting portion arranged adjacent each one of said apertures;

a plurality of open-ended tubular members, each of said tubular members having an internal bore for receiving a duct of said first and second conduits in respective ends thereof;

wherein said assembly is in use, said tubular members are arranged substantially parallel to each other between said first and second end caps, and said first and second end caps are mounted via said mounting portions to the ends of said tubular members such that said apertures of said first and second end caps are aligned with respective bores of said tubular members; and wherein each of said tubular members comprises a recess on an external surface thereof for engagement with a spacer for arranging said tubular members substantially parallel to each other.

23. A coupling assembly for connecting first and second multi-duct conduits in aligned end to end relationship comprising:

first and second end caps, each of said first and second end caps having a plurality of apertures therethrough for receiving a respective duct of one of the first and second conduits and a respective mounting portion arranged adjacent each of said apertures;

a plurality of open-ended tubular members, each of said tubular members comprising an elongate cylindrical body portion having a widened rim at each of its end and an internal bore for receiving a duct of the first and second conduits in respective ends thereof; and wherein when said assembly is in use, said tubular members are arranged substantially parallel to each other between said first and second end caps and said first and second end caps are mounted via said mounting portions to the rims of said tubular members such that said apertures of said first and second end caps are aligned with respective bores of said tubular members.

24. A coupling assembly for connecting first and second multi-duct conduits in aligned end to end relationship comprising:

first and second end caps, each of said first and second end caps having a plurality of apertures therethrough for receiving a respective duct of one of the first and second conduits and a respective mounting portion arranged adjacent each one of said apertures;

a plurality of open-ended tubular members, each of said tubular members comprising an elongate cylindrical body portion having a flange at each of its ends and an internal bore for receiving a duct of said first and second conduits in respective ends thereof; and wherein said assembly is in use, said tubular members are arranged substantially parallel to each other between said first and second end caps, and said first and second end caps are mounted via said mounting portions to the flanges of said tubular members such that said apertures of said first and second end caps are aligned with respective bores of said tubular members.

* * * * *

UNITED STATES PATENT AND TRADEMARK OFFICE
CERTIFICATE OF CORRECTION

PATENT NO. : 6,076,863
DATED : June 20, 2000
INVENTOR(S) : George Henry Platt Brown and Bernard Gajos It is certified that error appears in the above-identified patent and that said Letters Patent is hereby corrected as shown below:

<u>Column 4,</u>
Line 10, "6f" should read -- of --.
Line 15, "Oring" should read -- O-ring --.

<u>Column 5,</u>
Line 3, "comprising." should read -- comprising: --.

Signed and Sealed this

Fourteenth Day of August, 2001

*Attest:*

NICHOLAS P. GODICI
*Attesting Officer*   Acting Director of the United States Patent and Trademark Office